United States Patent [19]
Fischli et al.

[11] Patent Number: 5,690,995
[45] Date of Patent: Nov. 25, 1997

[54] SPRAY BOOTH FOR POWDER COATING

[75] Inventors: Gallus Fischli, Tubach; Silvano Gelain, Abwil; Markus Lenherr, Arnegg, all of Switzerland

[73] Assignee: Gema Volstatic AG, St. Gallen, Switzerland

[21] Appl. No.: 581,401

[22] Filed: Dec. 29, 1995

[30] Foreign Application Priority Data

Jan. 13, 1995 [DE] Germany .............. 195 00 873.1

[51] Int. Cl.⁶ .............. B05D 1/02; B05D 1/12; B05B 15/12; B05C 19/06
[52] U.S. Cl. .............. 427/180; 427/345; 427/421; 427/478; 118/309; 118/312; 118/326
[58] Field of Search .............. 427/180, 345, 427/478, 421, 350; 118/309, 312, 326

[56] References Cited

U.S. PATENT DOCUMENTS

| 3,814,002 | 6/1974 | Rombach et al. | 98/115 B |
| 4,354,451 | 10/1982 | Vohringer et al. | 118/326 |
| 4,409,009 | 10/1983 | Lissy | 55/302 |
| 5,346,553 | 9/1994 | Pingel | 118/309 |

FOREIGN PATENT DOCUMENTS

| 602409 | 6/1994 | European Pat. Off. . |
| 218990 | 3/1977 | German Dem. Rep. . |
| 2449065 | 4/1976 | Germany . |
| 2835474 | 2/1980 | Germany . |
| 3406464 | 9/1985 | Germany . |
| 3602172 | 12/1986 | Germany . |
| 3538800 | 5/1987 | Germany . |
| 3704551 | 5/1988 | Germany . |
| 3714052 | 7/1988 | Germany . |
| 4012676 | 10/1990 | Germany . |
| 9203366 | 10/1992 | Germany . |
| 4126890 | 2/1993 | Germany . |
| 4131287 | 3/1993 | Germany . |
| 4134701 | 4/1993 | Germany . |
| 4339492 | 5/1994 | Germany . |
| 4300837 | 7/1994 | Germany . |
| 54-65739 | 5/1979 | Japan . |
| 560558 | 4/1975 | Switzerland . |
| 577346 | 7/1976 | Switzerland . |

*Primary Examiner*—Shrive Beck
*Assistant Examiner*—Fred J. Parker
*Attorney, Agent, or Firm*—MacMillan, Sobanski & Todd

[57] ABSTRACT

A spray booth for use in the spray coating of articles with coating powder. The spray booth forms a coating space which at a bottom is bounded by powder collection means. The powder collection means is divided into an inner collection means and a surrounding outer collection means for the separate collection of surplus powder and the separate removal of the entire surplus powder from the booth. The outer collection means collects surplus coating powder dropping off the inside surfaces of the booth walls. Since this powder may be contaminated with different color or different types of powder from previous spraying operations, it is discarded as waste. The inner collection means collects pure surplus powder which has not touched the booth wall surfaces. This pure surplus powder is recycled.

13 Claims, 4 Drawing Sheets

SPRAY BOOTH FOR POWDER COATING

TECHNICAL FIELD

The invention relates to spray booths and more particularly to an improved spray booth for spray coating objects with powder which is suited particularly for automatic spray coating operation, but also can be used for coating with the aid of hand-held powder spray guns.

BACKGROUND ART

The powder sprayed in the prior art powder coating booths and not adhering to the object drops for the most part on a booth floor, while a small share clings to the booth walls. The surplus powder not adhering to the object can be drawn from the booth floor and separated from the exhaust airflow by means of powder separation, notably cyclone and/or filter elements, subsequently screened and thereafter mixed with fresh powder before being returned to the spray device and sprayed again. A color change (change from one powder type to another) requires not only extremely thorough cleaning of all inside surfaces of the booth, but also of the cyclones and filter systems as well as powder lines, so that no powder particles of the powder used first will be mixed with the powder used thereafter. Even single powder particles can lead to coating defects on the object, making the coating unacceptable. One only needs to imagine a change from a black or red powder to a white powder or vice versa. The objects being coated may be, for example, household utensils or car bodies, whose buyers will not tolerate color defects. While the reclamation of surface powder reduces the manufacturing cost, the problem remains, however, that very much time and/or additional system parts (for example, exchangeable powder separators, screening devices, fluid lines) are needed in a color change in order to avoid long down times of the system. A spray coating operation with surplus powder reclamation becomes uneconomical and the operation must be run on a loss whenever multiple color coatings are involved and objects need to be coated with different colors. "Running on loss" means that the surplus powder is not reclaimed and reused, but is discarded as waste. Cleaning is more difficult and time-consuming when more powder is allowed to deposit in the booth and on other parts. Therefore, metal booths are substituted by plastic booths, since the powder particles adhere less strongly and in smaller amounts to the latter than they do to metal booths. The powder particles consist mostly of plastic, but may consist also of ceramic.

DISCLOSURE OF INVENTION

The objective which the invention is meant to accomplish is to further reduce the expense of time and/or additional system parts required for a color change or powder change, without having to forego a good coating quality.

The spray booth according to the invention represents a system for quick color change. It consists in a preferred embodiment of the booth, a cyclone separator with following screening machine and powder feed system, and of a powder center supplying the spray device, or spray devices, with coating powder either from separate powder containers or directly from drums (containers in which the coating powder is shipped to powder users by the powder manufacturer). When for long periods of operation objects are coated with the same powder type and other powder needs to be used in between only for short periods of operation, it is advantageous to run this other powder "on loss" and remove it from the booth as waste, without passing surplus powder to the powder reclamation device provided for long periods of operation. This eliminates for this color change or powder change the need for cleaning the powder reclamation device. Only the booth needs to be cleaned. While cleaning the booth, regardless of whether with or without cleaning the powder reclamation device, it is advantageous to continuously draw the powder removed from the booth inside surfaces off by means of an exhaust airflow which is generated separately from an exhaust airflow of the powder reclamation system in the booth.

According to the invention, the spray booth includes two powder collection means at the bottom of the booth. Any powder which contacts the side walls of the booth falls into an outer collection means. The outer collection means also may collect a small amount of powder which did not adhere to the object being sprayed and which did not contact the booth walls. The powder collected in the outer collection means is discarded as waste, since it may include powder contamination from previous spraying with a different color or a different type of powder. Most of the powder which does not adhere to the object being sprayed is collected in an inner collection means. None of the powder which contacts the booth walls enters the inner collection means. The powder collected in the inner collection means is separated from the exhaust air with, for example, a cyclone separator, and is recycled to the spray guns for application to objects.

Accordingly, it is an object of the invention to provide a spray booth for powder coating articles which is easily cleaned to facilitate color change.

Other objects and advantages of the invention will become apparent from the following detailed description of the invention and the accompanying drawings.

BRIEF DESCRIPTION OF THE DRAWINGS

FIG. 8 is a diagrammatic vertical cross section of a powder coating spray booth according to a further modified embodiment of the invention.

BEST MODE FOR CARRYING OUT THE INVENTION

Figure 1:
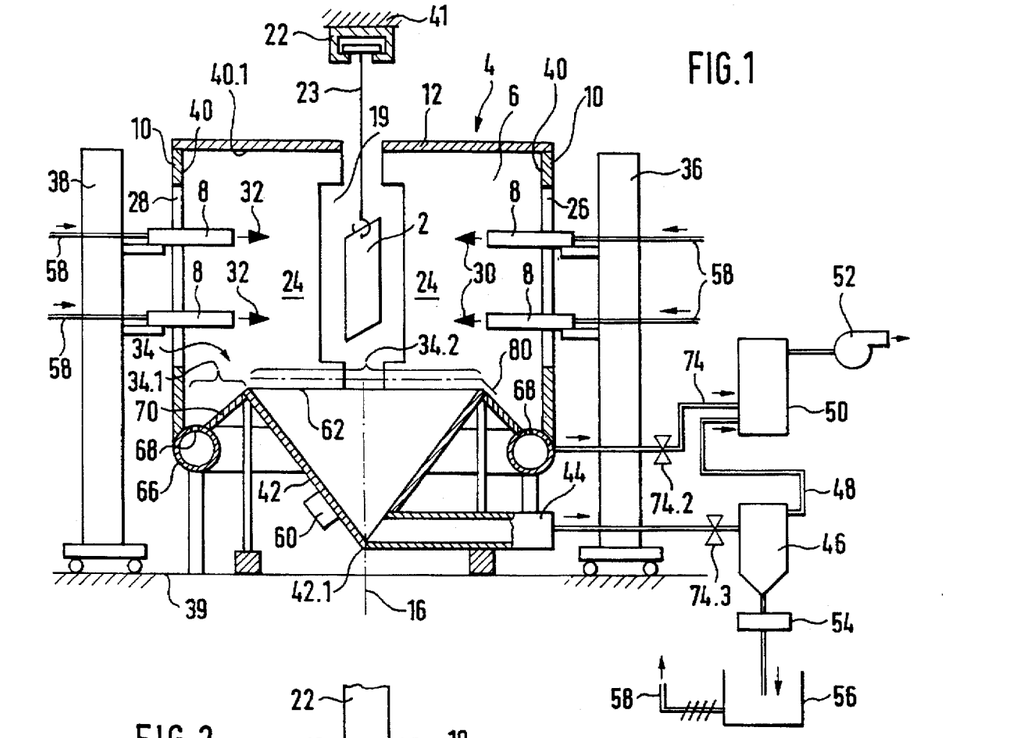
FIG. 1 is a diagrammatic vertical cross section of a powder coating spray booth according to the invention for either manually or automatically spray coating of objects with coating powder.
Figure 2:
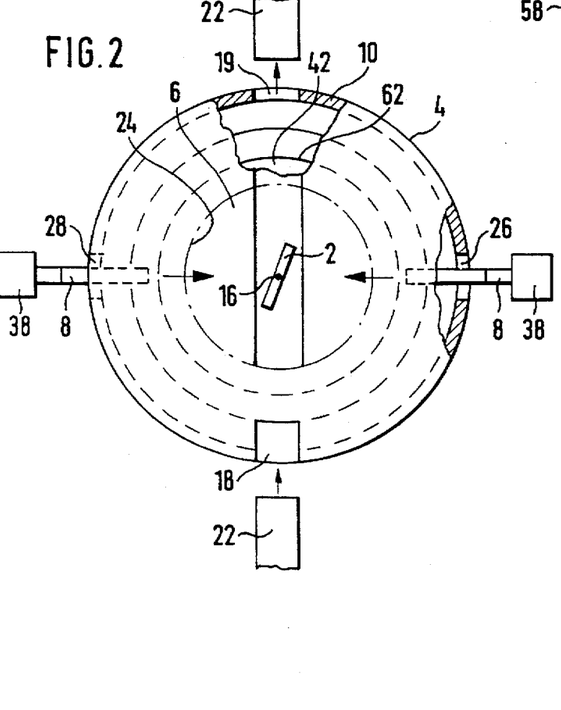
FIG. 2, a plan view, in partial section, of essential parts of the spray booth relative to FIG. 1.
Figure 3:
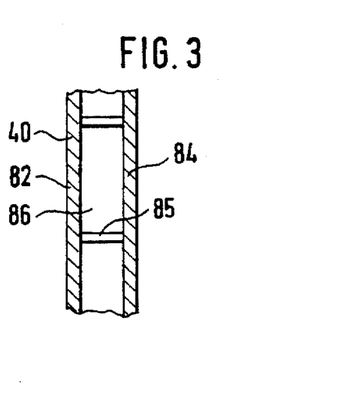
FIG. 3 is an enlarged fragmentary cross sectional view of a portion of a wall of the booth of FIG. 1.

Illustrated in FIGS. 1 through 3, the spray coating device for manual and automatic operation for the spray coating of objects 2 comprises a spray booth 4 that forms a coating space 6 in which the objects 2 are coated by means of one or several spray devices 8. Viewed in horizontal section, the booth wall 10 and booth roof 12.2 are round in shape or at least have a shape circular on all sides and approximating a circle, in the radial center of the theoretical vertical center axis 16 of which the booth 4 is located. According to a not illustrated modified embodiment, viewed in horizontal section, the booth 4 may have an oval shape approximating a circle, instead of a circular shape. It can be seen from the drawings that the booth side wall 10 surrounds the perimeter of the booth, and the side wall defines and encloses the coating space 6. Although the booth is shown in FIG. 2 as having a circular cross-section with a surrounding wall, it is to be understood that spray booths having other cross-sectional shapes can be used. Contained in the booth wall 10, on diametrically opposed sides, are through openings 18 and 19; each in the form of vertical slots dividing the booth wall 10 and booth roof 12.2 in two equally large segments. Splitting the booth 4 in identical segments extending across the entire height of the coating space 6 simplifies the manufacture and transport of booth 4. Doors may be fitted to through openings 18 and 19 and, in a modified embodiment, the through openings 18 and 19 may be formed in such doors. The objects 2 being coated hang on hooks 23 of a conveyer system 22 passing the objects to be coated through the one through opening 18 into the radial center area 24 of the coating space 6, where the objects 2 are coated, and then through the other through opening 19 out of the booth 4 again. The center area 24, viewed in horizontal section, is the area of coating space 6 located radially within 75% of the radius of the said coating space 6.

Offset about the center axis 16, preferably by 90° relative to the through openings 18 and 19, are two diametrically opposed spray openings 26 and 28 in the form of vertical slots bounded on all sides, in the booth wall 10, through which extend the spray devices 8. The spray directions 30 of spray devices 8 of the one spray opening 26 are arranged in alignment with and opposite to the spray directions 32 of the spray devices 8 of the other spray opening 28 in order for the air jets of the spray streams passing the object 2 to collide with one another, causing surplus powder to drop, concentrated in the center area 24, by gravity to the booth floor 34.

The spray devices 8 are supported on each spray opening 26 and 28 by reciprocators 36 and 38 standing outside booth 4 on building floor 39. The reciprocators 36 and 38 move the spray devices 8 up and down under automatic control. Each reciprocator 36 and 38 is able to support one or several spray devices 8, which may be arranged one above the other or side by side. According to another embodiment, the spray devices 8 may be so directed that their spray directions 30 and 32 pass by each other. With the spray directions 30 and 32 offset relative to each other in the same direction relative to the radial center axis 16, their powder-airflows can produce a vortex flow in the round booth 4. Instead of automatically controlled spray devices 8, also hand-held spray devices, or spray guns, may be used. All spray devices 8 are preferably moved in synchronism, in order to coat the objects 2 over their entire height.

The booth floor 34 is of a design such that surplus powder dropping from the wall inside surfaces 40 of booth wall 10 can be removed from booth 4 separately of the surplus powder dropping without prior contact with said wall inside surfaces 40 on the booth floor 34. For that purpose, booth floor 34 is divided in outer collection means 34.1 and inner collection means 34.2. The outer collection means 34.1 extends about the entire inside circumference of the wall inside surfaces 40 in the form of a relatively narrow strip. The inner collection means 34.2 are surrounded by outer collection means 34.1 and border directly on these, covering the entire area of booth floor 34 located within outer collection means 34.1 and 34.2. Thus the inner collection means 34.2 is spaced interiorly with respect to the side wall 10. The design of the latter is such that the powder dropping on them is unable to proceed to the respective other collection means and mix with the powder contained there. The surplus powder dropping on the inner collection means 34.2 must not mix with, or be contaminated by the surplus powder of outer collection means 34.1. In contrast, it is not unfavorable (except for being treated as waste powder) for a small share of the surplus powder of inner collection means 34.2 to proceed to the outer collection means 34.1. In the embodiment illustrated in FIGS. 1 and 2, inner collection means 34.2 features a hopper 42, to the lower tip of which a first powder suction line 44 of a cyclone separator 46 is connected. An exhaust line 48 of the cyclone 46 is hooked to the inlet side of a filter system 50 that separates residual powder from the exhaust of cyclone 46, and to the outlet side of which connects an exhaust blower 52. The powder separated by the cyclone 46 from the powder-airflow of powder exhaust line 44 proceeds from the lower cyclone end to a screening machine 54 and drops then in a powder container 56. The powder container 56 may be one in which fresh powder is shipped by the powder manufacturer to the powder user. The fresh powder and the surplus powder reclaimed by cyclone 46 and screening machine 54 are fed from powder container 56 to the spray devices 8 via powder lines 58. Hopper 42 may be vibrated by means of a vibrating device 60, thus facilitating the sliding of powder dropping into it to the tip of the hopper. The upper, diametrically largest hopper rim 62 extends sideways beyond the center area 24 situated above it and borders directly on the outer collection means 34.1.

The outer collection means 34.1 possess an exhaust collection line 66 which is arranged on the bottom end of booth wall 10 and extends around the entire peripheral length of the booth wall 10. Exhaust collection line 66 has on its top side, distributed across its entire length, at least one (slot) or a plurality of suction holes 68, which are located between wall inside surface 40 and transitional wall 70 and border directly on these two. The top side of exhaust collection line 66, and thus also its suction holes 68, are situated on a level lower than upper hopper rim 62 of inner collection means 34.2. The transitional wall 70 tapers, forming a downwardly increasing outside diameter and bridges the small difference in height and the small radial difference in width of the booth floor 34, between suction holes 68 and hopper rim 62. Powder particles dropping from the wall inside surface 40 proceed therefore either directly into suction holes 68 or first on the transitional wall 70, sliding then from it into suction holes 68. When the transitional wall 70 consists of flexible material, for example rubber, the vibrations of vibrator 60 are prevented from transmitting from hopper 42 to booth wall 10. In case such vibration transfer is desired or there is no vibrator used, the transition wall 70 may consist of rigid material, preferably plastic. According to other embodiments, the transition wall 70 may have a different shape, for example the form of a cylinder, or may be omitted entirely, with the hopper rim 62 of hopper 42 bordering directly on exhaust collection line 66.

Exhaust collection line 66 is connected by means of a second powder exhaust line 74 to the inlet side, or upstream side, of filter system 50, in order to be able to separate surplus powder by means of a second exhaust airflow. The surplus powder filtered by filter system 50 out of the second exhaust airflow of suction line 66 and the surplus powder separated out of exhaust line 48 of cyclone 46 in filter system 50 is discarded, constituting a loss. Hence, exhaust blower 52 can generate a first exhaust airflow in hopper 42 and a second exhaust airflow in the suction holes 68 of exhaust collection line 66. A shut-off element 74.2 and/or 74.3 may be fitted in the two, or at least one of the two, outer exhaust lines 44 and 74, for selectively closing them. According to another embodiment, separate exhaust blowers 52 may be used for generating each of the exhaust airflows. Instead of exhaust airflows, compressed airflows may be used, but with several disadvantages.

The basic idea of this embodiment is that the sprayed powder not adhering to the object 2, hereafter referred to as surplus powder, is (a) divided in a first surplus powder which did not proceed onto the inside surfaces of booth wall 10 and in a second surplus powder which did proceed onto said inside surfaces 40 and drops then by itself or due to a cleaning process, and (b) removing the first surplus powder and the second surplus powder, separately from each other, from the booth 4. For that purpose, the booth wall 10, viewed in horizontal cross section, may have the circular shape illustrated in the drawings, an oval shape or a selective angular shape. The second surplus powder must not proceed into the first surplus powder. In contrast, it is not harmful when a small share of the first surplus powder proceeds into the second surplus powder. This basic idea enables various methods, as follows:

Step 1: In a spray coating phase, as coating powder is sprayed on objects 2, the first surplus powder (without wall contact) of the inner collection means 34.2 is fed, continuously or discontinuously, out of the spray booth 4, and is preferably drawn off pneumatically by suction, and is reclaimed for recycling.

Step 1.1.1: During the spray coating phase after Step 1, the second surplus powder (with wall contact) is left in the booth 4 on the outer collection means 34.1, or according to Step 1.1.2: Is fed continuously or discontinuously out of the spray booth 4, and is preferably drawn off pneumatically by suction.

Step 2: During the cleaning phase (for example in a spray coating pause at powder change or color change) the second surplus powder (with wall contact) is removed from the spray booth 4 by means of the outer collection means 34.1, with Step 2.1.1: First surplus powder (without wall contact) being removed from the spray booth 4 simultaneously by the inner collection means 34.2, or according to Step 2.1.2: No first surplus powder (without wall contact) being removed from the spray booth 4 by the inner collection means 34.2 and, for example, the inner collection means 34.2 being covered up with a cover 80.

Step 3: Instead of Step 1, Step 1.1.1 and Step 1.1.2: during a spray coating phase, as coating powder is sprayed on the objects 2, there is according to Step 3.1.1: Either no surplus powder (neither first nor second powder) removed from the spray booth 4, and the inner collection means 34.2 and the outer collection means 34.1 are covered up with a cover 80 or similar means, in order for them not to be "contaminated" by surplus powder, or according to Step 3.1.2: There is only the second surplus powder of the outer collection means 34.1 removed from the spray booth 4, but no first surplus of the inner collection means 34.2, in that only the inner collection means 34.2 is covered with the cover 80.

Step 4: Then following Step 3 and 3.1.1 or 3.1.2, the same Steps 2 and 2.1.1 or 2.1.2.

The collection means 34.41 and/or 34.2 are connected via exhaust lines 44 and/or 74 to an exhaust airflow only when surplus powder is meant to be exhausted, but not when powder is not meant to be removed by the respective collection means 34.1 and 34.2.

The method according to Steps 1, 1.1.1, and 1.1.2 is chosen whenever the same coating powder is used for an extended time. The method according to Steps 3, 3.1.1 and 3.1.2 is preferably used when frequent color changes or powder changes are required or longer spray coating phases are interrupted in order to briefly use a different coating powder. This makes it possible to handle different applications with a single system.

When a powder change is to be carried out between spray coating phases in which the first surplus powder of the inner collection means 34.2 is being reclaimed, only the powder reclamation system (the hopper 42, its powder exhaust line 44, the cyclone 46 and the screening machine 54) as well as the ceiling inside surface 40.1 of the spray booth 4 need to be cleaned thoroughly, and the container 56 must be replaced. In contrast, the wall inside surfaces 40 of the spray booth 4 require only rough cleaning, since powder particles which drop off while another powder is used cannot proceed into the hopper 42, and thus cannot proceed into the powder container 56. Much time and cleaning expense is saved thereby. When changing over to another powder type for only a brief period of time, not even hopper 42 and its powder exhaust line 44 or the cyclone 46 and screening machine 54 need to be cleaned. Rather, it is sufficient to cover the hopper 42 up with a cover 80 (schematically illustrated by a dashed line) while coating with the other powder only as long as objects 2 are being coated with the other powder. The inside surfaces 40 of the spray booth 4 require only a rough cleaning, so that no previously sprayed powder will drop off while coating with the other powder.

The circular booth 4, viewed in horizontal cross section, has a symmetric structure. Its wall inside surfaces 40 are similarly circular and have their radial center in the center axis 16. The bottom tip 42.1 of the hopper 42 is situated in this center axis 16, and exhaust collection line 66 is arranged concentric with the center axis 16. The hopper 42 tapers downward in a straight-line, truncated fashion. The booth wall 10, the booth ceiling 12, the hopper 42, the exhaust collection line 66 and the transition wall 70 consist preferably of electrically nonconducting material, preferably plastic, since this material invites powder particles to adhere to it less than does metal, for example. Similarly, the lines 44, 48, 74 through which the powder flows may be made of electrically nonconducting material, for instance plastic. The slot type through openings 18 and 19 divide booth 4 in two equal, bowl type booth halves. The booth 4 also may be a single part or may be divided into several equally large segments. According to a preferred embodiment, the booth wall 10, preferably also the booth ceiling 12, consists of a double-wall structure according to FIG. 3 with an inside wall 82 and an outside wall 84 joined by stays 85 and defining a cavity 86 filled with air, preferably at atmospheric pressure. The space 86 may be open to outside air and sealed as against the coating space 6. The inside wall 82 and the outside wall 84 consist each of plastic.

According to a modified embodiment (not shown), the spray devices 8 enter the coating space 6 of the booth 4 not through spray openings in the booth wall, but through spray openings in the booth ceiling 12. Also, a cleaning device in the form of a rotatable frame that rotates about the vertical center axis 16 may be inserted in the booth 4 to automatically clean the inside surfaces of booth 4.

Figure 4:
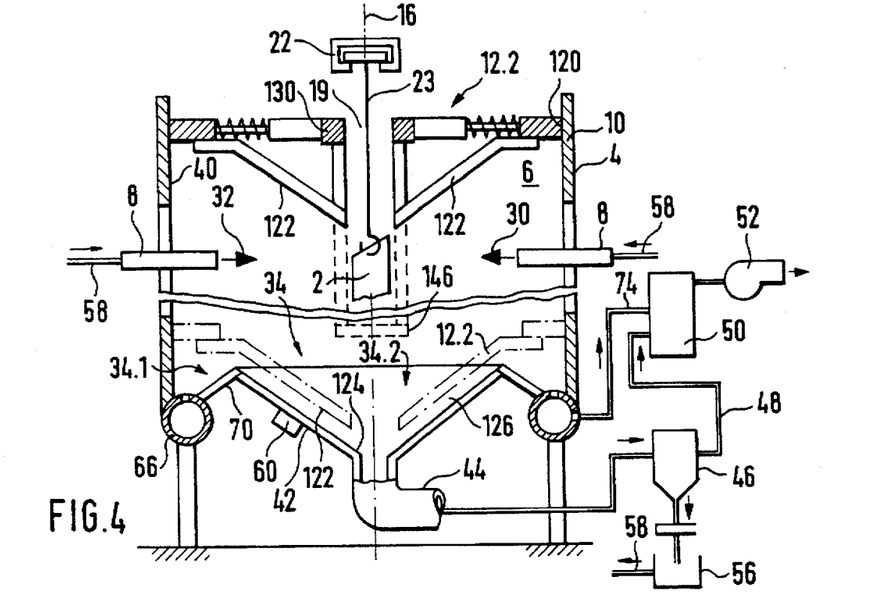
FIG. 4 is a diagrammatic vertical cross section of a powder coating spray booth according to a modified embodiment of the invention.
Figure 5:
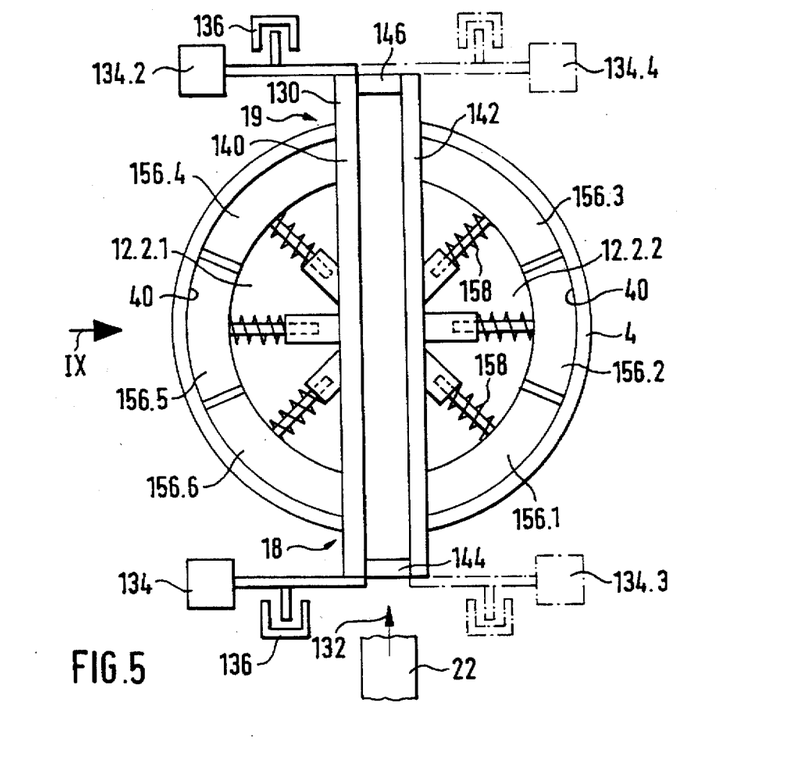
FIG. 5 is a top plan view of essential parts of the spray booth of FIG. 4.
Figure 6:
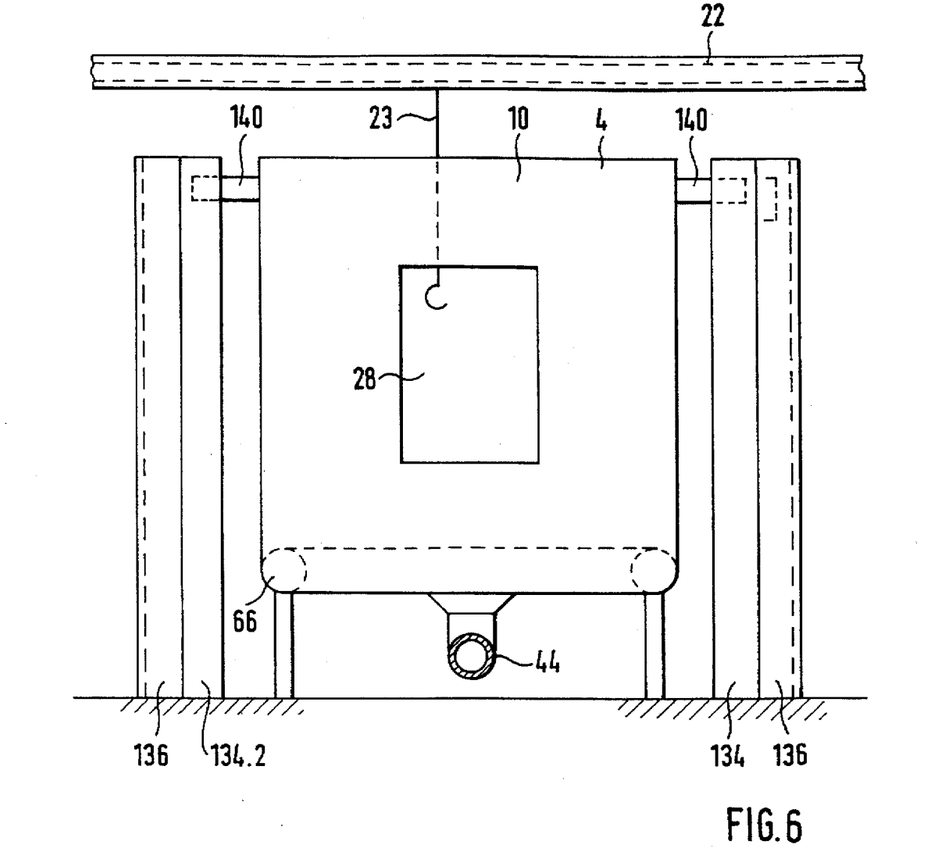
FIG. 6 is a side elevational view of the spray booth of FIG. 1 as viewed from the left along arrow IX.

The spray coating devices according to FIG. 4, 5 and 6 are identical with the spray coating device according to FIG. 1, 2 and 3, except for the booth roof, which is illustrated, there, only schematically, whereas here it is shown in detail and referenced 12.2. The booth wall 12.2 can be lowered along the vertical booth wall inside surfaces 40, in the booth, down to the booth floor 34. The outer periphery 120 of the booth roof 12.2 is situated directly beside the booth inside wall surfaces 40 and features cleaning means for cleaning said booth wall inside surfaces 40 while the booth roof 12.2 is being lowered from its uppermost starting position (solid lines in FIG. 4) to its bottom most position (dash-dot lines in FIG. 4). Thus, the booth roof 12.2 is sort of a "lift" capable of being lowered and raised. In lowering, the cleaning means on its outer periphery 120 automatically clean the entire periphery and entire height of the booth inside wall surfaces 40. Another particular feature of the booth roof 12.2 is that its underside is adapted to the shape of at least a portion of the booth floor 34, but at least to the shape of the inner collection means 34.2, in that the roof surface 122 pointing down in the coating space 6 has a truncated-cone shape the same as hopper 42, thus fitting into said hopper 42 by shape and size. During a cleaning operation for powder change, the booth roof 12.2 is preferably lowered only to a point such that a narrow gap 126 remains between the lower booth roof surface 122 and the upward-pointing inner hopper surface 124. This gap 126, hereafter referred to as powder exhaust gap, is so narrow that it chokes the air flow, thereby causing an acceleration of the air which by exhaust blower 52 is sucked, beneath the lowered booth roof 12.2, out of booth 4 through hopper 42. The accelerated air entrains powder clinging in the powder exhaust gap 126 to lower booth surface 122 of lower booth roof 12.2 and to upward-pointing inner hopper surface 124, thus thoroughly cleaning said surfaces 122 and 124.

The booth roof 12.2 may be supported by one or several raising devices and moved down and up. According to the embodiment relative to FIGS. 4 through 6, the booth roof 12.2 is provided with a support 130 that extends through the through openings 18 and 19 out of the booth 4 and allows vertical motion within said through openings 18 and 19, along with booth roof 12.2. The support 130 is carried by at least one raising device 134 arranged outside the booth beside the path of travel 132 of transport device 22 and moves vertically in the stated manner. Support 130 may run vertically in vertical guides 136, in order for the raising device 134 to be required to generate only the raising forces, whereas it is not burdened by transverse forces of booth roof 12.2 and its support 130 transverse to the center axis 16 of booth 4. Since the raising device 134 must be located beside the transport path 132 of the transport device 22 and of the objects 2, it is automatically arranged beside the through openings 18 or 19. In the illustrated preferred embodiment, such raising device 134 is arranged beside each of these two through openings 18 and 19, with the second raising device, in FIG. 8, referenced 134.2. As illustrated schematically, four raising devices 134, 134.2, 134.3, 134.4 for equalization of transverse forces could be arranged outside the booth 4.

In the embodiment relative to FIG. 4, 5 and 6, the booth wall 12.2 is split in two mirror-inverted equal halves which, symmetric to the through openings 18 and 19, are arranged beside the path of travel 132 of transport device 22 with the objects 2, and mutually connected by support 130. The support 130 has a girder 140 supporting the one booth roof half 12.2.1 and extending in the direction of the path of travel 132 of objects 2, and has a second girder 142 supporting the other booth roof half 12.2.2 and extending parallel to said girder 140. The two girders 140 and 142 are connected to each other outside the booth 4, on both ends, by a cross beam 144 and 146. These two cross beams 144 and 146 are arranged outside booth 4 to avoid being coated with powder, and their arrangement is so low that the hooks 23 with their objects 2 are able to clear. According to a not illustrated embodiment, the two cross beams 144 and 146 are omitted, and each girder 140 and 142 is supported by a raising device 144 of its own (134.2., 134.3, 134.4). This makes it possible to lower or raise the girders 140 and 142 along with their booth roof halves 12.2.1. and 12.2.2, separately or in synchronism.

According to a further, not illustrated embodiment, the lower booth roof surface 122 may be adapted to the shape of the outer collection means 34.1 opposing it, i.e., notably to the shape of exhaust collection line 66 and transition wall 70, in a way such that a narrow powder exhaust gap is created between them, through whose air acceleration powder clinging to their surfaces is torn away and removed by the exhaust airflow.

Figure 7:
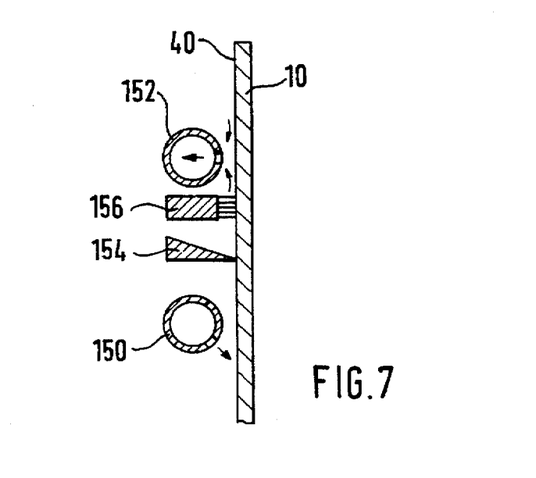
FIG. 7 is an enlarged diagrammatic fragmentary vertical sectional view through various embodiments of cleaning means used to clean the inside surfaces of the booth wall.

The cleaning means provided around the entire periphery 120 of the booth roof 12.2., for cleaning the booth wall inside surfaces 40, may be according to FIG. 7, for example, one or several of the following means, each arranged about the entire inner booth wall circumference and, with several such cleaning means used, above one another: compressed air nozzles 150 to blow compressed air, as the case may be ionized air, at the booth wall inside surfaces 40, suction nozzles 152 for suction removal of powder particles from the booth wall inside surfaces 40, scraping elements 154 or sweeping elements 156, for example brush elements or a sponge, such as illustrated schematically in FIG. 7. Instead of bristles, the sweeping elements 156 may have a fabric cover of velvet or other material, for wiping the powder off the booth inside wall 40.

As an example of such cleaning means, sweeping elements 156 in the form of segments 156.1, 156.2, 156.3, 156.4, 156.5 and 156.6 are illustrated schematically in FIG. 5, arranged in a horizontal plane and bordering circularly on one another on the booth wall inside surfaces 40, with springs 158 forcing them elastically on the booth wall inside surfaces 40. They are supported by girders 140 and 142. The segments are able to blast, vacuum and/or wipe or brush the booth inside wall surfaces, dry or wet. Instead of springs 158, other elastic hold-downs may be used, for example pneumatic cylinders.

According to a not illustrated embodiment, only the booth roof outer periphery 120 provided with cleaning means is lowerable, but not the booth roof part situated radially within the periphery 120. In this case, the booth wall inside surfaces 40 can be cleaned as described above. No powder exhaust gap 126 is then being formed on the booth floor; instead, the exhaust airflow must without such gap formation be sufficient to suck all of the powder particles from the elements of booth floor 34.

Figure 9:
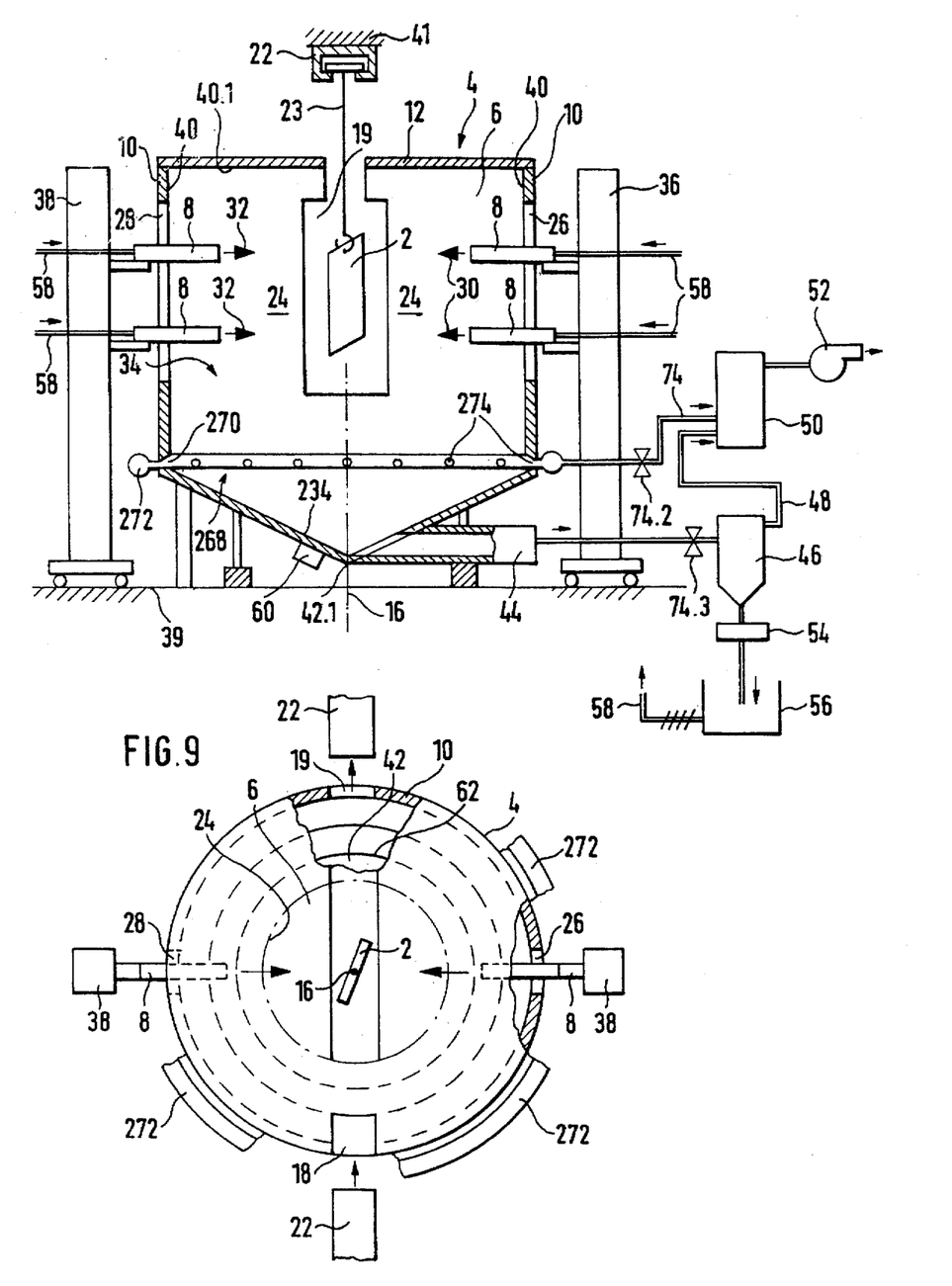
FIG. 9 is a top plan view of essential parts of the spray booth of FIG. 8.

The following describes the embodiment according to FIG. 8 and 9 to the extent it deviates from the embodiment relative to FIG. 1 and 2. In respect of corresponding features, the description relative to FIG. 1 and 2 applies.

The booth floor 234 has the shape of a hopper and extends, declining obliquely toward the cone tip, from the booth wall 10 to an outlet in the hopper tip. The powder exhaust line 44 of the cyclone 46 connects to that outlet. The booth floor 234 serves as inner collection means (similar to the said inner collection means 34.2 of FIG. 1) for removal of surplus powder across the entire inner horizontal cross section of booth 4.

In the booth wall 10, on its bottom end on which the booth floor 234 borders, a second powder outlet 268 is formed which extends horizontally around the entire booth 4 and connects to the second powder exhaust line 74 of filter system 50. The second powder outlet 268 serves as an outer collection means (similar to outer collection means 34.1 of FIG. 1) for suction removal of surplus powder dropping off the wall inside surface 40 of booth wall 10 during the spray coating operation and/or cleaning of booth 4. The second powder outlet 268 consists in the preferred embodiment illustrated in FIG. 8 and 9, in exhaust airflow direction, successively of an annular slot 270 in the booth wall 10 around the entire booth 4 and a manifold pipe 172 arranged outside the booth wall 10, which by way of numerous holes 274 communicates fluidically with annular slot 270 while connected to the second powder exhaust line 74.

Contained in the powder exhaust line 44 of the cyclone 46 and in powder exhaust line 47 of filter system 50 is a closure element 74.3, or 74.2, each, for instance an on/off valve, an adjustable throttle plate, a cock or a similar device. The two powder lines 44 and 74 can thus be selectively opened or closed, individually or both. In a preferred embodiment, the closure element 74.3 to the cyclone 46 is during a spray coating operation of longer duration opened and the closure element 74.2 to the filter system 50 closed; both closure elements 74.3 and 74.2 are closed while the booth is being cleaned, so that a stronger airflow can be sucked out of booth 4, with the speed of rotation of exhaust blower 52 being raised during cleaning.

Another operating mode is possible for spray coating operation of short duration or with frequent change of one powder type for another: the entire booth floor 234 is sealed by a lid, the closure element 74.3 of the cyclone 46 is closed, and closure element 74.2 of the filter system 50 is opened, so that the blower 52 can suck powder out of the spray booth 4 only through the annular slot 270 of the powder outlet 268. The annular slot 270 sucks air from the spray booth 4 at a right angle to its center axis 16. In a modified embodiment, the two powder exhaust lines 44 and 74 are connected to separate vacuum supplies or exhaust blowers.

It will be appreciated that various modifications and changes may be made to the above described preferred embodiment of without departing from the scope of the following claims.

We claim:

1. A spray coating booth for use in spray coating articles with powder, said booth containing a side wall which surrounds the perimeter of the booth to define and enclose a coating space, and a floor connected to said side wall and forming a bottom for the coating space, said floor including an outer collection means arranged around the perimeter of said booth and along said side wall to collect and remove surplus powder dropped onto said floor along said side wall, and an inner collection means positioned on said floor and spaced interiorly of said side wall to collect and remove surplus powder dropping onto said floor interiorly of said side wall, where surplus powder dropping around the perimeter of said booth and along said side wall is collected by said outer collection means, and surplus powder dropping interiorly of said side wall is simultaneously collected by said inner collection means, thereby enabling a separation of the surplus powder dropping on the interior of said floor from the surplus powder dropping on said floor near the side wall so that the surplus powder collected by said inner collection means can be reused.

2. A booth adapted for use in spray coating articles with powder, as set forth in claim 1, and further including powder exhaust means connected to said inner collection means for suction removal of surplus powder and exhaust air collected by said inner collection means.

3. A booth adapted for use in spray coating articles with powder, as set forth in claim 1, and further including a coating means for spray coating articles in the booth with the powder, and means for returning surplus powder collected by said inner collection means to said coating means.

4. A booth adapted for use in spray coating articles with powder, as set forth in claim 2, and further including a first powder separator having an inlet connected to receive exhaust air and powder from said inner collection means, said first powder separator having a powder outlet and an exhaust air outlet, a second powder separator adapted to remove powder from a flow of air, means for passing air from said first separator exhaust air outlet through said second powder separator, and means for passing exhaust air and powder from said outer collection means through said second powder separator.

5. A booth adapted for use in spray coating articles with powder, as set forth in claim 1, and wherein said inner collection means includes a downwardly tapering hopper which forms the interior of said booth floor, said hopper having a powder outlet opening.

6. A booth adapted for use in spray coating articles with powder, as set forth in claim 1, and wherein said outer collection means includes a powder suction outlet along said side wall to extend around the perimeter of said booth, and suction means for exhausting air and entrained powder through said powder suction outlet.

7. A booth adapted for use in spray coating articles with powder, as set forth in claim 1, and wherein said side wall has a circular shape in horizontal section.

8. A booth adapted for use in spray coating articles with powder, as set forth in claim 1, and further including means for removing powder from the surfaces of said side wall.

9. A booth adapted for use in spray coating articles with powder, as set forth in claim 8, and wherein said powder removing means causes powder removed from the surfaces of said side wall to fall to said outer collection means without entering said inner collection means.

10. A method of spray coating articles with powder from a spray booth, said booth containing a side wall which surrounds the perimeter of the booth to define and enclose a coating space, and a floor connected to said side wall and forming a bottom for the coating space, said floor including an outer collection means arranged around the perimeter of said booth and along said side wall to collect and remove surplus powder dropped onto said floor along said side wall, and an inner collection means positioned on said floor and spaced interiorly of said side wall to collect and remove surplus powder dropping onto said floor interiorly of said side wall, comprising spray coating articles with the powder in the booth with a coating means, collecting surplus powder dropping around the perimeter of said booth and near said side wall with said outer collection means, and simultaneously collecting surplus powder dropping interiorly of said side wall with said inner collection means, thereby separating the surplus powder dropping on the interior of said floor from the surplus powder dropping on said floor around the perimeter of said booth along the side wall so that the surplus powder collected by said inner collection means can be reclaimed.

11. A method of spray coating articles with powder from a spray booth, as set forth in claim 10, and further including the steps of returning surplus powder collected by said inner collection means to said coating means, and discarding the surplus powder collected by said outer collection means.

12. A method of spray coating articles with powder from a spray booth, as set forth in claim 10, including causing powder which is adhered to said side wall to fall onto said outer collection means.

13. A method of spray coating articles with powder from a spray booth, as set forth in claim 12, and further including causing powder to fall with a vibrating device.

* * * * *